Sept. 22, 1936.  R. GUYER  2,055,379
EGG FLAT
Filed Aug. 27, 1932   2 Sheets-Sheet 1
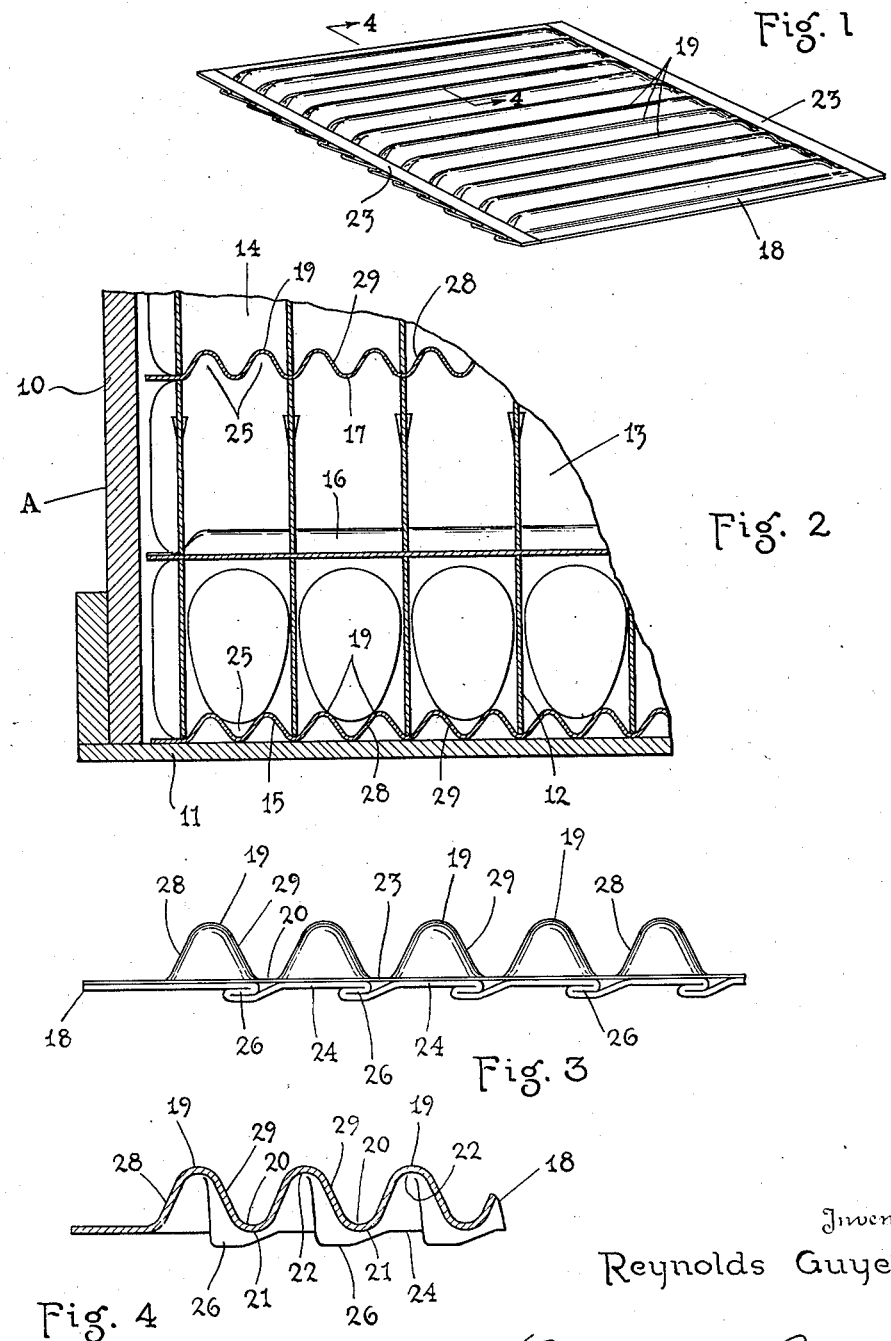
Inventor
Reynolds Guyer
By Caswell & Lagaard
Attorney Sept. 22, 1936.  R. GUYER  2,055,379
EGG FLAT
Filed Aug. 27, 1932    2 Sheets-Sheet 2

Inventor
Reynolds Guyer

By Caswell & Lagaard
Attorneys

Patented Sept. 22, 1936

2,055,379

UNITED STATES PATENT OFFICE 2,055,379

EGG FLAT

Reynolds Guyer, St. Paul, Minn., assignor to Waldorf Paper Products Company, St. Paul, Minn., a corporation of Minnesota Application August 27, 1932, Serial No. 630,637

6 Claims. (Cl. 217—27)

My invention relates to egg flats and has for an object to provide an egg flat for use in an egg case, by means of which the eggs carried in the case are effectively cushioned so as to prevent breakage thereof in the handling of the case.

Another object of the invention resides in providing an egg flat which can be constructed at a nominal cost and without the use of complicated machinery.

A still further object of the invention resides in providing an egg flat which can be constructed from a low grade of paper stock and with a small amount of material.

An object of the invention resides in providing an egg flat which will be equally as effective in cushioning the eggs on both sides thereof.

Another object of the invention resides in constructing the egg flat from a sheet of paper stock of a length greater than the length of the egg flat and in folding over the stock to take up the extra length and to form corrugations on both sides of the sheet and of the full width thereof.

A still further object of the invention resides in folding over the portions of the sheet at the ends of the corrugations to bring the same into overlying position.

Another object of the invention resides in providing any of a number of fastening devices for holding the folded over portions of the sheet in overlying position.

A still further object of the invention resides in providing an edging extending along the folded over ends of the corrugations and attached to each thereof.

Other objects of the invention reside in the various ways of folding the ends of the corrugations to prevent elongation of the egg flat so as to retain the form of the corrugations throughout their extent.

An object of the invention resides in providing a method of forming the egg flats in which the sheet of stock is first corrugated, then supported in corrugated formation and while so supported folded at certain localities to bring portions of the corrugations in juxtaposition and in which the juxtaposed parts of the corrugations are thereafter secured together.

Other objects of the invention reside in the novel combination and arrangement of parts and in the details of construction hereinafter illustrated and/or described.

In the drawings:

Fig. 1 is a perspective view of an egg flat illustrating an embodiment of my invention.

Fig. 2 is an elevational sectional view of a portion of an egg case, illustrating a number of my improved egg flats mounted therein.

Fig. 3 is an end elevational view of a portion of the egg flat illustrated in Fig. 1, and drawn to an enlarged scale.

Fig. 4 is a sectional view taken on line 4—4 of Fig. 1, and drawn to an enlarged scale.

Figure 5:
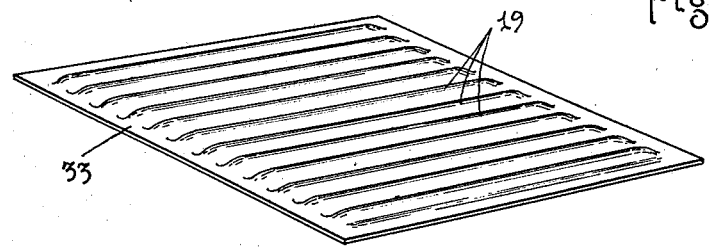
Fig. 5 is a view similar to Fig. 1 of a modification of the invention.

In egg flats of the nature now in common use considerable difficulty has been encountered in securing sufficient resiliency of the part of the flat directly supporting the egg so as to properly cushion the egg when the egg case is handled in the customary manner. Heretofore it has been practically impossible to provide suitable cushion means without the use of an excessive amount of paper or without the formation of the egg flat from the paper web prior to its being dried and calendered and formed into paper stock. The present invention provides an egg flat which may be constructed from ordinary paper stock of a relatively low grade and with an extremely small amount of paper.

For the purpose of illustrating the application of my invention I have shown in Fig. 2 a part of an egg crate which is indicated in its entirety at A. This egg crate may be constructed in any suitable manner and is provided with walls 10 and upper and lower closures 11 secured thereto. Within the case is disposed a number of egg case fillers 12, 13 and 14 which may be constructed in the usual manner and which are separated by egg flats 15, 16 and 17. These egg flats will now be described in detail.

To avoid repetition, only egg flat 16 will be described in detail, which egg flat is shown detached from the egg case in Fig. 1. This egg flat is constructed from a sheet of paper stock 18 of a length somewhat greater than the length of the egg flat. The sheet is first corrugated as by running the same through suitable corrugating rolls which takes up the extra stock of the material and which forms a number of corrugations in the sheet projecting from both sides thereof. The exact construction of the sheet 18 after being corrugated, is shown in Fig. 4 in which the corrugations extending from the upper side of the sheet are designated by reference character 19. These corrugations are separated by grooves 20 in the sheet also disposed on the upper side of the sheet. The portions of the sheet forming these corrugations are indicated by the reference numerals 28 and 29. In like manner, on the other side of the sheet and opposite the grooves 20 are formed corrugations 21 which extend in the opposite direction and which are separated by grooves 32 directly opposite the corrugations 19. In the further construction of the egg flat the corrugated sheet is supported in such a manner that the corrugations are maintained in the desired form. This may be accomplished by running the corrugated sheet between two belts having intermeshing slats thereon constructed in the shape of the corrugations. When such a device is used, the same is of a width less than the total width of the flat so that the ends of the corrugations are free from the supporting means. Where several egg flats are constructed across a single sheet of the paper stock the slats are discontinued at sections intermediate the ends thereof so that suitable portions of the corrugations conforming to the lateral edges of the egg flats to be constructed therefrom are unsupported. While the corrugated sheet is so supported, rollers are run over the ends 24 of the corrugations and the same flattened down into substantially a common plane as shown in Fig. 3. When the parts are so disposed it will be noted that the portions of the sheet forming the corrugations 19 overlie other portions of the sheet forming the corrugations 21, as indicated at 26. It will be further noted that the folded portions between corrugations are of an aggregate length equal to the pitch of the corrugations. When the ends of the corrugations are secured together these portions of the sheet hold the corrugations in proper form and prevent the same from flattening out.

For fastening the folded parts of the sheet at the ends of the corrugations together, any of a number of devices may be employed. In Fig. 3, I have shown a tape or a ribbon 23 which is glued to the upper surfaces of the portions 24 of said corrugations and which hold these parts of the sheet from elongating. This construction serves to retain the pitch of the corrugations and consequently to cause the corrugations to maintain the desired form.

In the use of the invention the egg flats are placed in the case in the ordinary manner. It will be noted that the corrugations thereof are exposed on both sides so that the eggs may directly contact with the corrugations regardless of whether the egg flat is arranged in one position or the other. When the egg flats are arranged as shown in Fig. 2, the lowermost portions of the eggs are received in the grooves 20 between the corrugations 19 and rest upon the walls 29 of said corrugations. This serves to cushion the eggs and prevents breakage thereof. The greater the height of the corrugations, the greater the cushioning effect. For satisfactory results a height of not less than one-quarter of the distance between partitions is preferable. Where an egg flat, such as illustrated, is employed it becomes necessary to either use shorter fillers or to construct the fillers with ears 25 which extend into the grooves 20 and 22 of the egg flat. The ears are formed at the lower ends of one set of partitions of the egg flats and at the upper ends of the other set of partitions so that the egg flats may be alternately arranged to cause the corrugations to extend at right angles to one another. This makes the entire structure more rigid and prevents the shifting of the eggs within the case in both directions.

Figure 7:
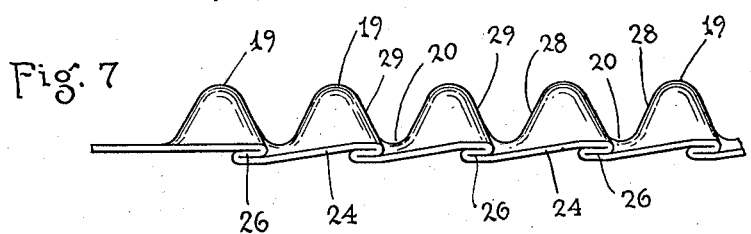
Fig. 7 is a view similar to Fig. 6 of still another form of the invention.

If desired, the folded portions 26 of the ends 24 of the corrugations may be glued together as indicated in Fig. 7. In this case glue is applied to both of the sides of the corrugated sheet at the desired localities, and the sheet pressed together to hold the glued portions in contact while the glue sets. In such construction the tape or ribbon may be dispensed with. However, if found desirable the same may be also used to form a more rigid and secure construction.

Figure 8:
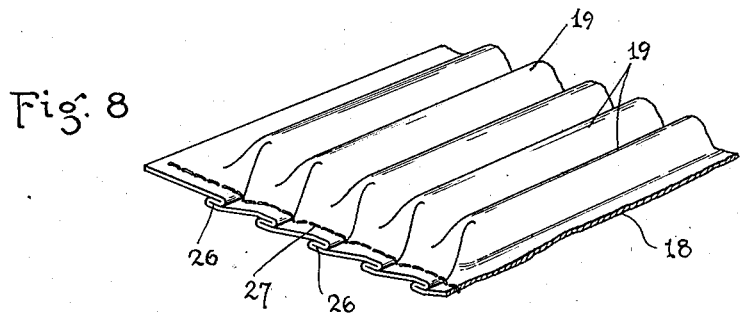
Fig. 8 is a perspective view drawn to an enlarged scale of a portion of still another form of the invention.

Instead of gluing the portions 26 together the same may be secured by stitching as with a sewing machine. Such construction is shown in Fig. 8 in which the stitching is indicated at 27. In such case the sewing machine follows the rolling operation, the foot of the sewing machine holding the parts 26 together while the needle stitches the same.

Figure 9:
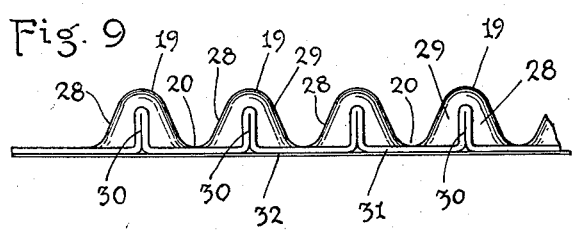
Fig. 9 is an end elevational view similar to Figs. 3 and 7 of another modification of the invention.

In Fig. 9 I have shown still another form of the invention in which the two parts 28 and 29 of the sheet forming each of the corrugations are pinched together as illustrated at 30 to leave a straight connecting portion 31 between corrugations at the ends thereof. Portions 30 may be glued together and if desired a ribbon 32 glued to the parts 31 of the egg flat. This construction, the same as in the other form of the inventions may be used with or without the ribbon 32 as desired.

Figure 6:
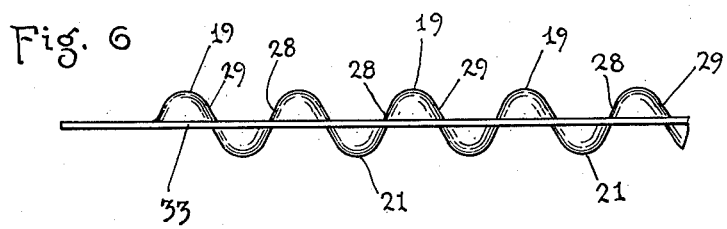
Fig. 6 is a view similar to Fig. 3 of the form of the invention shown in Fig. 5.

In Figs. 5 and 6, I have shown still another form of the invention in which the ends of the corrugations are compressed to form a homogeneous construction of substantially uniform thickness throughout. In the construction of this form of the invention the stock is moistened sufficiently at the ends of the corrugations to cause the fibers of the stock to become somewhat dissociated, permitting of compressing the stock into a composite structure of substantially uniform thickness. This forms marginal portions 33 along the ends of the sheet of uniform thickness and of a length equal to the length of the egg flat; the additional length of the stock of the sheet from which the egg flat is constructed, being absorbed in the method of forming said marginal portions. If desired, a suitable binder may be added to the moistened portion of the stock by means of which the compressed marginal portion 33 thereof may be caused to retain its shape after the rollers forming same leave the stock.

By means of my improved egg flat the corrugations on both sides thereof may be exposed so that the eggs are directly supported on the corrugations regardless of whether the egg flat is arranged with one of its surfaces uppermost or the other. In the construction of the egg flat the corrugations are of such a pitch that two corrugations on one side of the sheet, and one full corrugation, and two half corrugations on the other side of the sheet, are included within each egg cell. This causes the eggs when disposed upon the upper side of the egg flat to be supported on the two corrugations 19 of the flat disposed within the particular egg cell. When the egg case is handled the two corrugations spread apart and yield without imparting any appreciable shock to the eggs, thereby cushioning the same and preventing breakage thereof. In the event that the egg case be inverted, the eggs rest upon the intervening single corrugation within the egg cell. Due to the relatively large size of the corrugations, this corrugation yields in substantially the same manner as the two corrugations 19 when an egg is applied thereto, thereby cushioning the eggs and preventing breakage thereof.

My invention is highly advantageous in that an extremely simple and effective egg flat is provided by means of which breakage of eggs is greatly reduced. The egg flat can be constructed of ordinary paper stock of a relatively low grade, thereby greatly economizing in expense. A very small amount of material is required with my invention so that further economy in the construction of the egg flats results. By forming the flat from paper stock, and by thereafter securing the ends of the corrugations in proper position an appreciable depth of corrugation can be procured so that suitable cushioning of the eggs results. Where it has been attempted to press corrugations into a sheet by stretching the stock of the sheet, only relatively shallow corrugations could be procured which have been found to be unsuitable for the desired purpose.

My invention is reversible as previously described and is effective from either side thereof. My improved egg flat can be constructed with simple machinery. Egg flats constructed in accordance with my invention will be found to be quite durable and will outlast a number of the egg flats now employed and which do not have the other desirable characteristics of my invention.

Changes in the specific form of my invention, as herein disclosed, may be made within the scope of what is claimed without departing from the spirit of my invention.

Having described my invention, what I claim as new and desire to protect by Letters Patent is:

1. An egg flat constructed from a sheet of paper gathered to form corrugations extending completely across the sheet and having side walls and ridges connected to the side walls, said side walls at certain localities being flattened out into a substantially common plane below the plane of the upper ridges of the corrugations and attaching means secured to the flattened portions of the corrugations for holding the corrugations in proper position, said means being disposed entirely below the upper ridges of the corrugations.

2. An egg flat comprising a sheet having corrugations therein, formed by folding said sheet and disposed on both sides of the sheet, said corrugations extending across the sheet and up to the lateral edges thereof, and being exposed on both sides of the sheet, all of the portions of the sheet at the ends of the corrugations being changed in form by being folded into substantially a common plane and means for retaining the ends of said corrugations in said plane.

3. An egg flat constructed from a sheet of paper gathered to form corrugations extending completely across the sheet and having side walls and ridges connected to the side walls, said side walls at certain localities being flattened out into a substantially common plane below the plane of the upper ridges of the corrugations, and ribbons secured to the flattened portions of the corrugations for holding the corrugations in proper position, said ribbons being disposed entirely below the upper ridges of the corrugations.

4. An egg flat constructed from a sheet of paper gathered to form corrugations extending completely across the sheet and having side walls and ridges connected to the side walls, said side walls at certain localities being flattened out to a thickness less than the height of the corrugations, and attaching means secured to the flattened portions of the corrugations for holding the corrugations in proper position.

5. An egg flat constructed from a sheet of paper gathered to form corrugations extending completely across the sheet and having side walls and ridges connected to the side walls, said side walls at certain localities being folded to bring the upper ridges of the corrugations at such localities below the plane of the upper ridges of said corrugations, and attaching means secured to the corrugations at such localities for holding the corrugations in proper position, said means being disposed entirely below the upper ridges of the remaining portions of the corrugations.

6. An egg flat for use in conjunction with fillers constructed with intersecting partitions, said egg flat comprising a sheet having corrugations therein of a height not less than one fourth the distance between partitions and constructed with rounded ridges, said sheet being of a width substantially equal to the width of the filler and the corrugations therein extending completely across the sheet and up to the lateral edges thereof and being exposed on both sides of the sheet throughout substantially the entire area defined by the outermost partitions of the filler, and means along the lateral edges of the sheet and engaging said corrugations for holding the corrugations in form intermediate the ends thereof.

REYNOLDS GUYER.